US006478592B1

(12) United States Patent
Hu et al.

(10) Patent No.: US 6,478,592 B1
(45) Date of Patent: Nov. 12, 2002

(54) CARD EJECTING MECHANISM FOR CF CARD CONNECTOR

(75) Inventors: JinKui Hu; ZiQiang Zhu; GuoHua Zhang, all of Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/044,710

(22) Filed: Oct. 29, 2001

(51) Int. Cl.[7] ................................................ H01R 13/62
(52) U.S. Cl. ........................................ 439/159; 439/328
(58) Field of Search ................................. 439/159, 160, 439/327, 328

(56) References Cited

U.S. PATENT DOCUMENTS 5,647,755 A * 7/1997 Hida et al. ............... 439/328
5,820,396 A * 10/1998 Pan et al. ................. 439/328
6,042,411 A * 3/2000 Choy ....................... 439/328
6,139,339 A * 10/2000 Wu .......................... 439/159
6,159,026 A * 12/2000 Tomita ..................... 439/159
6,231,364 B1 * 5/2001 Liu .......................... 439/328
6,364,674 B1 * 4/2002 Kajiura .................... 439/159

* cited by examiner

Primary Examiner—Gary F. Paumen
(74) Attorney, Agent, or Firm—Wei Te Chung

(57) ABSTRACT

An ejecting mechanism for a card connector (10) comprises a push rod (30) movably mounted on the connector, an ejecting lever (40) pivotally mounted on the connector, and a pair of spring tabs (50) fixed on an insertion end of the connector. Each spring tab includes a fixed portion (56, 58) to fix the spring tab on the connector and a spring portion (52) having an inwardly extending section (54) adapted for engaging with a locking notch (108) of an inserted card (102), thereby ensuring a safe ejection of the card from the card connector.

1 Claim, 5 Drawing Sheets

CARD EJECTING MECHANISM FOR CF CARD CONNECTOR

BACKGROUND OF THE INVENTION

1. Field of the Invention

The present invention relates to a card ejecting mechanism for a CF (Compact Flash) card connector, and particularly to a card ejecting mechanism which can safely disconnect and eject a CF card from terminals of the CF card connector.

2. Description of Related Art

The market demand for CF cards has surged with the advent of new computers, cameras and electronic products. CF cards have widespread application in digital cameras for functioning as removable mass storage devices. Accordingly, CF card connectors are used in the digital cameras for engaging with the CF cards. The CF card connectors are often equipped with ejecting mechanisms for disconnecting and ejecting the CF cards therefrom. FIG. 5 shows a conventional ejecting mechanism for a CF card connector disclosed in U.S. Pat. No. 6,159,026. The CF card connector comprises a housing body 70 in which a plurality of terminals 8 are provided for electrical connection with a CF card 60, a pair of side arms 71 extending rearwardly from opposite ends of the housing body 70, and an ejecting mechanism 9. The ejecting mechanism 9 includes a push rod 90 movably mounted on one side arm 71, an intermediate plate 91 operatively connected to one end of the push rod 90, and an ejecting lever 92 operatively connected to the intermediate plate 91. The ejecting lever 92 has a pair of abutment portions 920 formed on opposite ends thereof. Responsive to the actuation of the push rod 90 in a card inserting direction, the ejecting lever 92 moves along the side arms 71 to permit the abutment portions 920 of the ejecting lever 92 to disconnect and eject the CF card 10 from the card connector.

However, the pushing force exerted on the push rod 90 is various according to different users. When the push rod 90 is subject to a large pushing force that makes the card fly off the card connector and fall down on the ground, the electric capability of the card may be adversely affected or even damaged.

Hence, an improved card ejecting mechanism for a CF card connector is required to overcome the disadvantages of the related art.

SUMMARY OF THE INVENTION

Accordingly, one object of the present invention is to provide an improved card ejecting mechanism for a CF card connector for suitably and safely ejecting a CF card from terminals of the CF card connector.

Another object of the present invention is to provide a CF card connector with an improved card ejecting mechanism, the card ejecting mechanism having a pair of spring tabs mounted on the CF card connector for ensuring a safe ejection of a CF card from the CF card connector.

In order to achieve the objects set forth, a card connector is equipped with an improved ejecting mechanism in accordance with the present invention. The connector includes a head portion with a plurality of terminals retained therein and a pair of guide arms rearwardly extending from opposite ends of the head portion. Each guide arm defines a chamber at a free end thereof. The ejecting mechanism comprises a push rod movably mounted on one guide arm, an ejecting lever pivotally mounted on the head portion, and a pair of spring tabs fixed on the guide arms. Each spring tab includes a base portion, a fixed portion fixing the spring tab on the guide arm and a spring portion integrally extending from the base portion and extending into the chamber of the guide arm. The spring portion has an inwardly extending section at a free end thereof. After the card is disengaged from the terminals of the head portion, it moves along the guide arms and final arrives at a position where the inwardly extending sections of the spring tabs engage with locking notches of the card, thereby preventing the card from further movement, i.e., flying off the connector.

Other objects, advantages and novel features of the invention will become more apparent from the following detailed description when taken in conjunction with the accompanying drawings.

DETAILED DESCRIPTION OF THE INVENTION

Figure 1:
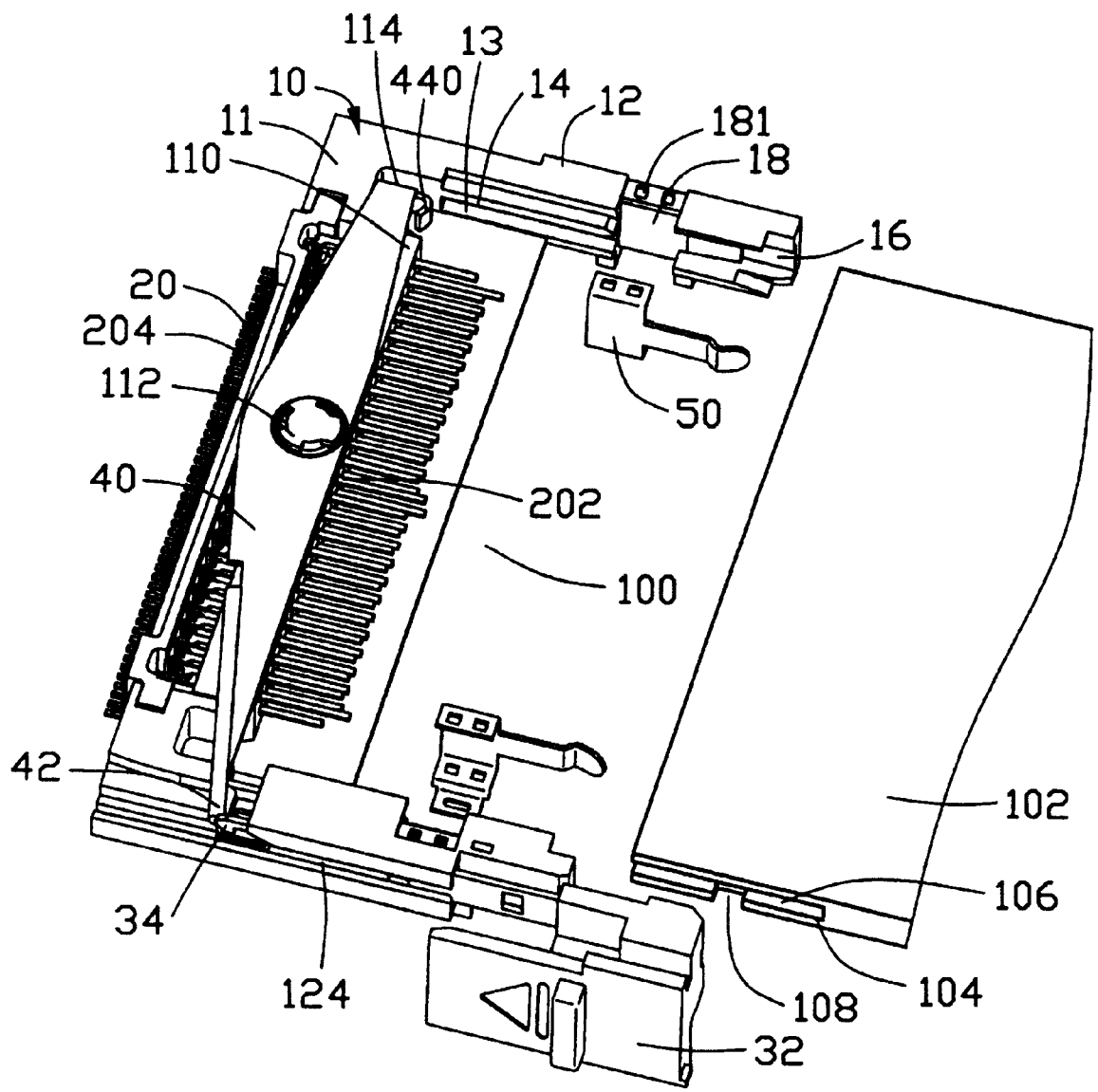
FIG. 1 is a perspective view of a CF card connector having a card ejecting mechanism in accordance with the present invention, with a pair of spring tabs of the ejecting mechanism unassembled thereto and a CF card disconnected thereto.

Referring to FIG. 1, a CF card connector 10 having a card ejecting mechanism in accordance with the present invention is shown. The CF card connector 10 is mounted in a digital camera (not shown) for engaging with a CF card 102 which functions as a removable mass storage device of the digital camera. The CF card 102 has a pair of slots 106 in opposite side faces 104 thereof, and a pair of locking notches 108 each in communication with a corresponding slot 106.

The CF card connector 10 comprises an insulative body including an elongated head portion 11 in which a plurality of terminals 20 are provided for electrical connection with the CF card 102, and a pair of guide arms 12 extending rearwardly from opposite ends of the head portion 11 for guiding the CF card 102. A card-receiving space 100 with a card-receiving opening is defined by the head portion 11 and the opposite guide arms 12. The head portion 11 has a housing body 110 with an embossment 112 upwardly extending therefrom. Each guide arm 12 has a pair of vertically aligned projections 13 formed on an inside face thereof and a card guiding channel 14 is provided between the projections 13. A pair of chambers 16 are provided in the insides of the guide arms 12 at an insertion end of the connector 10. Each guide arm 12 also has a mounting portion 18 located between the guiding channel 14 and the chamber 16. The mounting portion 18 has a plurality of protrusions 181 formed on a top face and a bottom face thereof. The card connector 10 has a lever-containing section 114 lying at the housing body 110 of the head portion 11 and a rod-containing section 124 lying at one of the guide arms 12.

The terminals 20 are retained in the head portion 11. Each terminal 20 includes a mating portion 202 extending into the card-receiving space 100 for electrical connection with corresponding terminals (not shown) of the CF card 102, a retention portion (not shown) retained in the housing body 110, and a tail portion 204 extending beyond a front face of the head portion 11 for electrically connecting with a printed circuit board (not shown) via a Surface Mount Technology (SMT).

Figure 2:
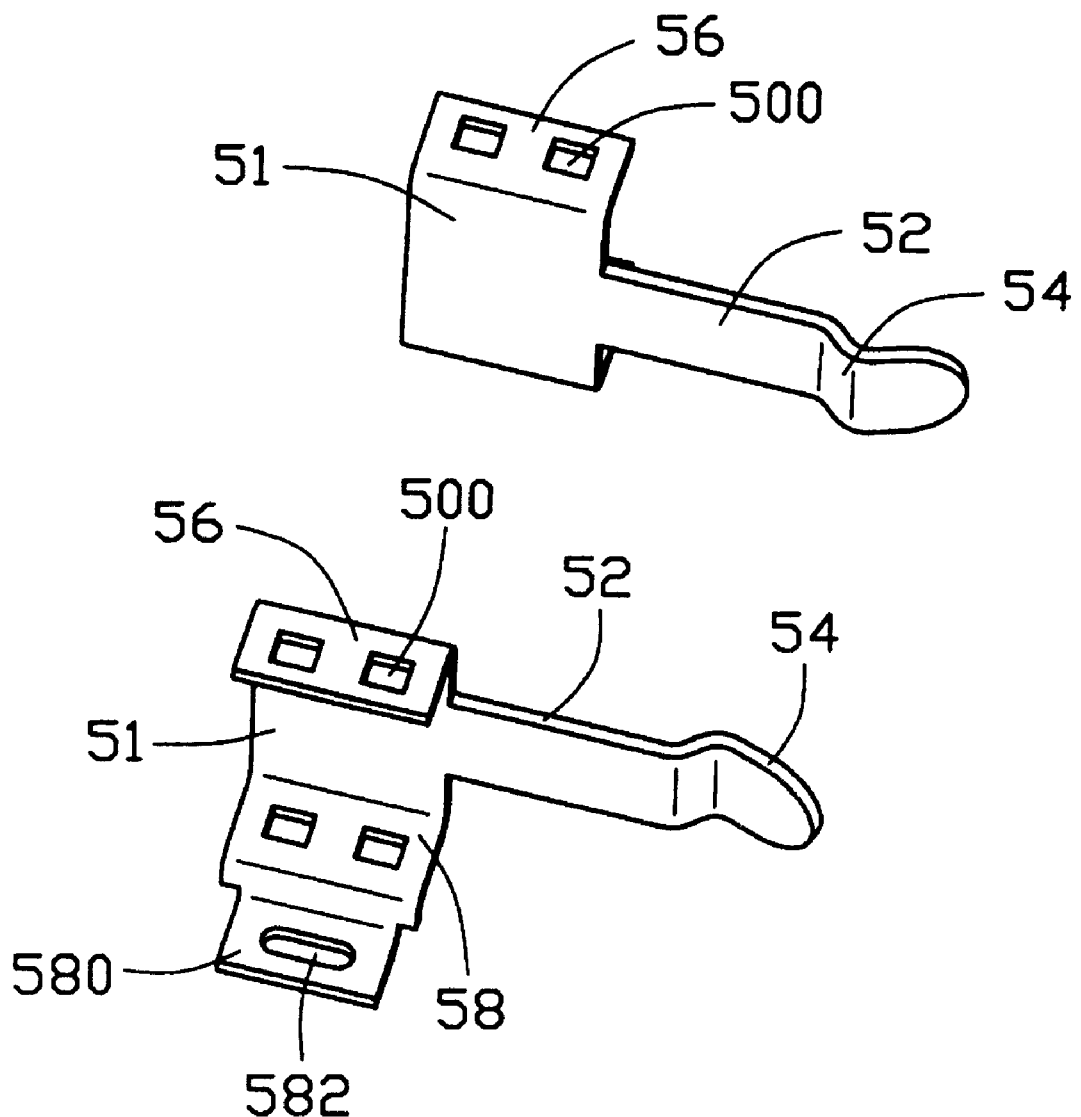
FIG. 2 is an enlarged, perspective view of the spring tabs of the ejecting mechanism of FIG. 1.
Figure 3:
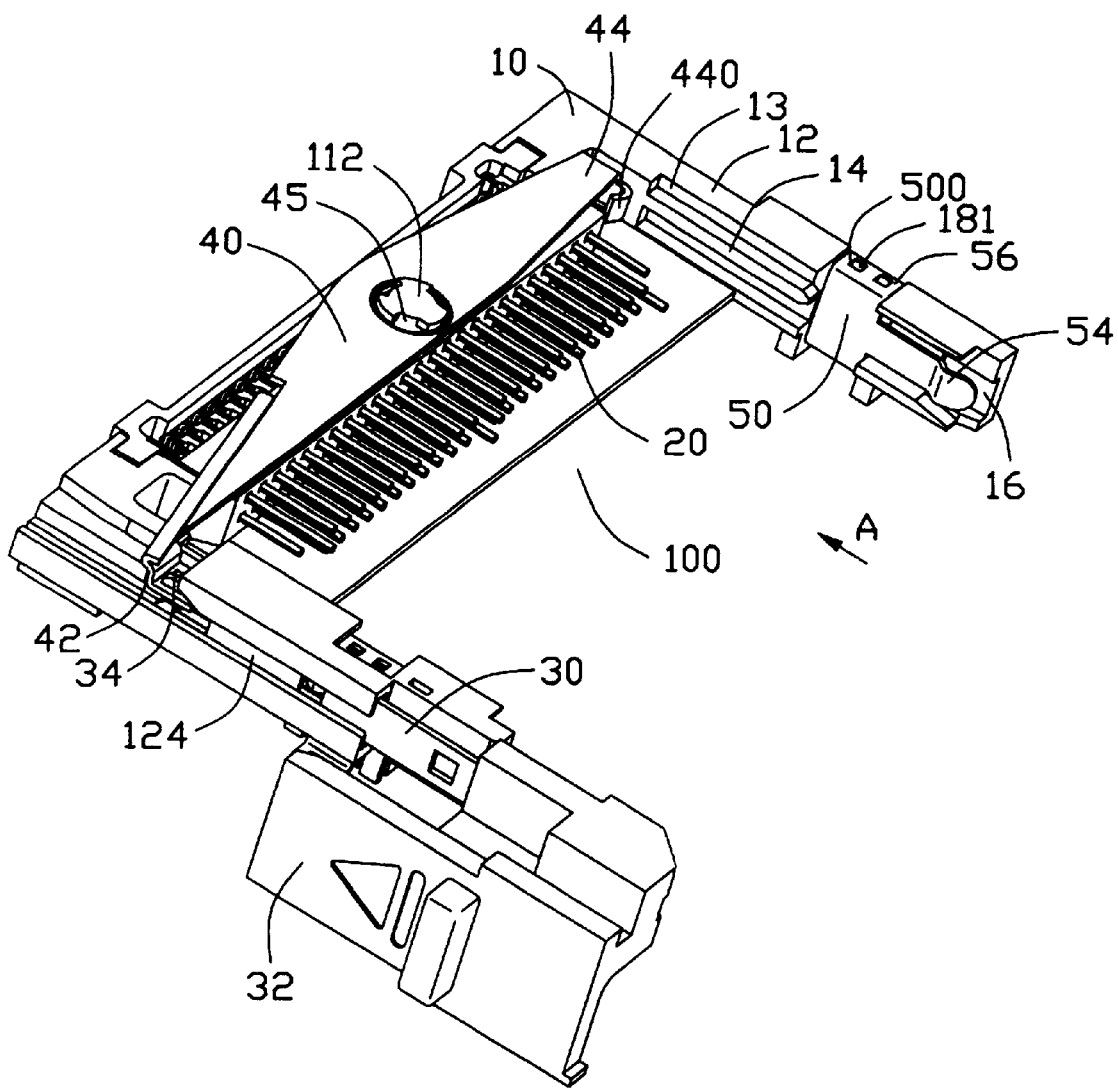
FIG. 3 is a perspective view of the CF card connector of FIG. 1, with the spring tabs mounted thereon.

Further referring to FIGS. 2 and 3, the connector 10 is equipped with the ejecting mechanism for disconnecting and ejecting the card 102 from the connector 10. The ejecting mechanism comprises a push rod 30 movably mounted within the rod-containing section 124 of the guide arm 12, an ejecting lever 40 pivotally mounted within the lever-containing section 114 of the head portion 11, and a pair of spring tabs 50 fixed on the guide arms 12. The push rod 30 has a push-button 32 at its actuating end and an opposite end 34 connected to a joint end 42 of the ejecting lever 40. The ejecting lever 40 has a pushing projection 440 formed on the other end 44 thereof for ejecting the CF card 102 from the connector 10. The ejecting lever 40 defines a hole 45 between the joint end 42 and the pushing projection 440 for engaging with the embossment 112 of the housing body 110, whereby the ejecting lever 40 is pivotally mounted on the housing body 110. The embossment 112 functions as a fulcrum about which the ejecting lever 40 rotates.

The spring tabs 50 are mounted on the mounting portions 18 of the guide arms 12. Each spring tab 50 includes a rectangular base portion 51, a spring portion 52 integrally extending from one side edge of the base portion 51, an upper fixed portion 56 perpendicularly extending from an upper edge of the base portion 51, and a lower fixed portion 58 perpendicularly extending from a lower edge of the base portion 51. The spring portion 52 has an inwardly extending section 54 at a free end thereof for engaging with the locking notch 108 in the side face 104 of the CF card 102. Each of the fixed portions 56, 58 defines a pair of apertures 500 for engaging with protrusions 181 of the guide arms 12. The lower fixed portion 58 has an extension 580 projecting beyond a free end of the upper fixed portion 56 with a slot 582 defined therein. The extensions 580 are connected with grounding traces (not shown) of the printed circuit board on which the connector 10 is mounted for ESD (Electrostatic Discharge) protection.

The spring tabs 50 are assembled to the mounting portions 18 from the insides of the guide arms 12. The protrusions 181 of the mounting portions 18 are received and retained in the corresponding apertures 500 of the fixed portions 56, 58 of the spring tabs 50, whereby the spring tabs 50 are fixed on the guide arms 12. At the same time, the spring portions 52 of the spring tabs 50 are disposed adjacent to free ends of the guide arms 12 and extend into the chambers 16 of the guide arms 12.

Figure 4:
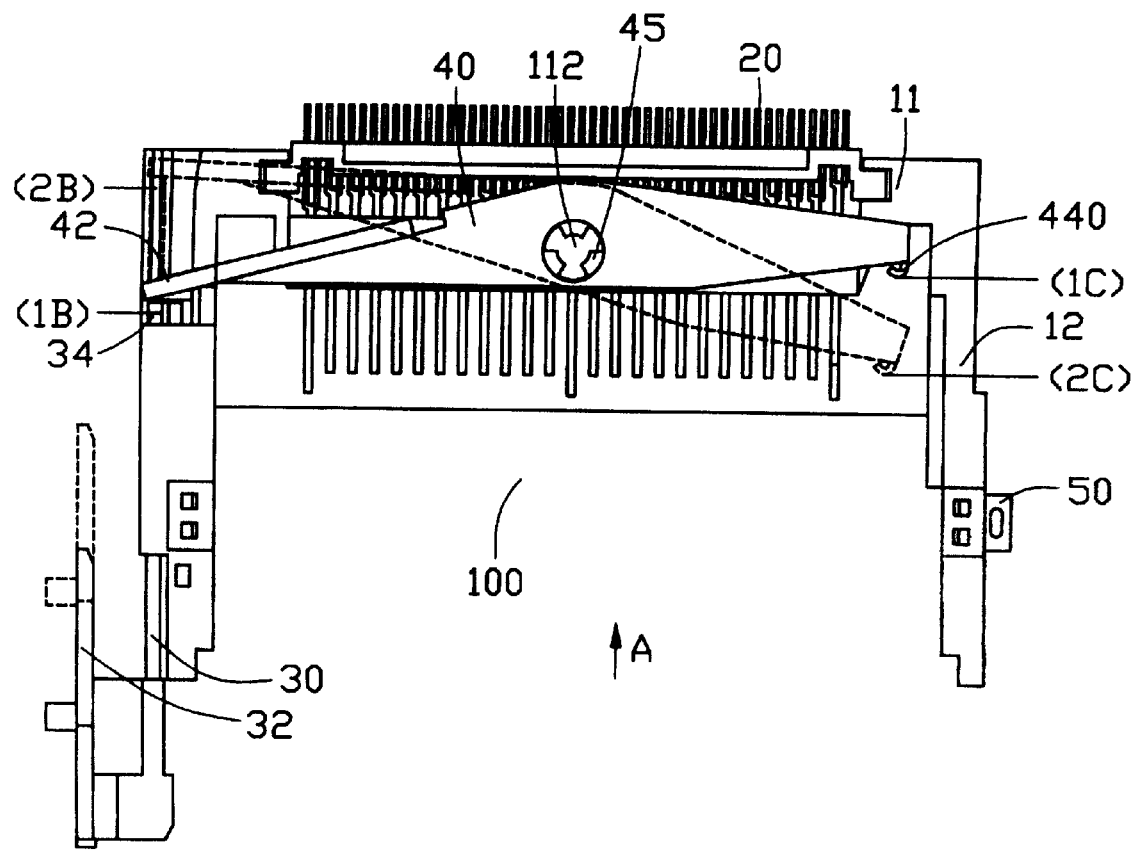
FIG. 4 is a top, plan view of the CF card connector showing an ejecting lever of the card ejecting mechanism in original (solid lines) and final (dashed lines) positions.
Figure 5:
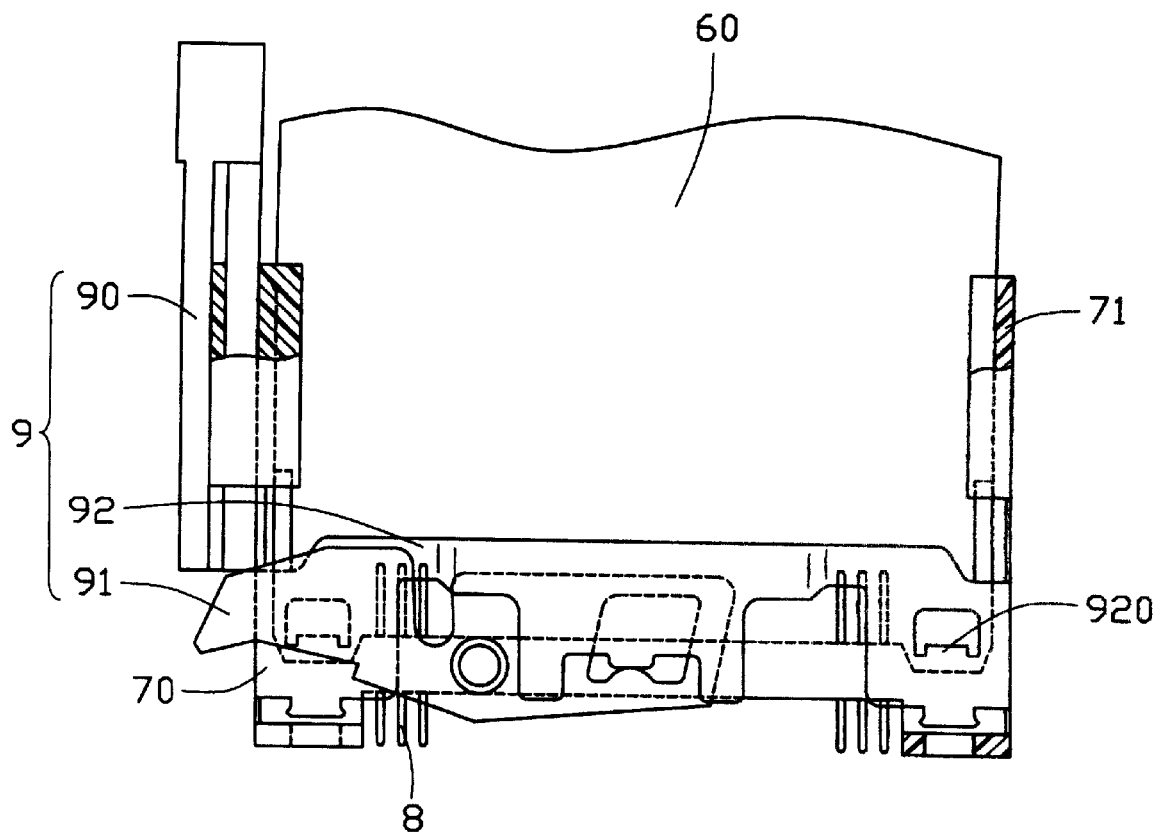
FIG. 5 is a top, plan view of a conventional card connector having a card ejecting mechanism.

Also referring to FIG. 4, during insertion of the CF card 102 into the card-receiving space 100 of the connector 10 along a direction indicated by an arrow "A", the CF card 102 is guided by the guide arms 12 and then connected to the mating portions 202 of the terminals 20. During this process, the spring portions 52 with the inwardly extending sections 54 of the spring tabs 50 deflex outwardly in a compressed condition by the opposite side faces 104 of the CF card 102 to resiliently abut against the side faces 104 of the CF card 102.

To eject the card 102 from the card connector 10, the push rod 30 is moved in the card inserting direction "A"0 by exerting a pushing force on the push-button 32, the opposite end 34 of the push rod 30 moves from its unactuated position 1B to its final position 2B, thereby causing the ejecting lever 40 to rotate about the embossment 112 in a clockwise direction. At the same time, the pushing projection 440 of the ejecting lever 40 moves from its original position 1C to its final position 2C to eject the card 102, thereby disengaging the corresponding terminals of the card 102 from the terminals 20 of the head portion 11. Following disengagement, the card 102 moves along the guide arms 12 and arrives at a final position where the inwardly extending sections 54 of the spring tabs 50 engage with the locking notches 108 of the card 102, thereby preventing the card 102 from further movement, i.e., flying off the connector 10. Then, through pushing the inwardly extending sections 54 of the spring tabs 50 out of the way, the card 102 is removed by a user. With this arrangement, the spring tabs 50 fixed on the opposite guide arms 12 limit the ejecting distance of the card 102 from the housing body 110, whereby the card is safely ejected from the connector 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A connector apparatus comprising:
   an insulative body defining a card-receiving space, a card-receiving opening at one end of the card-receiving space, and a rod-containing section positioned laterally of the card-receiving space;
   a push rod movably mounted within the rod-containing section of the insulative body;
   an ejecting lever pivotally mounted on the insulative body and pivotally connected with the push rod for ejecting an inserted CF card; and
   a pair of spring tabs each including a base portion, an upper and a lower fixed portions respectively extending from an upper and a lower edges of the base portion for fixing the spring tab on the insulative body, and a spring portion integrally extending from a side edge of the base portion and disposed adjacent to the card-receiving opening, the spring portion having an inwardly extending section for stopping a further movement of the CF card;
   wherein the inwardly extending section is integrally formed at a free end of the spring portion;
   wherein the lower fixed portion has an extension projecting beyond a free end of the upper fixed portion for grounding;
   wherein the insulative body includes a head portion and a pair of guide arms extending rearwardly from opposite ends of the head portion, and wherein the card-receiving space is defined by the head portion and the guide arms, and wherein the rod-containing section is defined in one of the guide arms;
   wherein the head portion has an embossment extending upwardly therefrom, and wherein the ejecting lever has a joint end and a pushing projection adapted for ejecting a CF card and defines a hole therebetween for engaging with the embossment, the push rod having an actuating end and an opposite end operatively connected to the joint end of the ejecting lever;

wherein each guide arm defines a chamber at a free end thereof for receiving the spring portion of the spring tab;

wherein each guide arm has a plurality of protrusions formed thereon, and wherein the upper and the lower fixed portions of the spring tab define a plurality of apertures receiving and retaining the protrusions therein.

* * * * *